Feb. 14, 1961   M. KRAMCSAK, JR   2,971,211
SEALED CASTER
Filed Aug. 18, 1958

INVENTOR
M. KRAMCSAK JR.

BY *G. J. Downs*

ATTORNEY

United States Patent Office 2,971,211
Patented Feb. 14, 1961

2,971,211

SEALED CASTER

Michael Kramcsak, Jr., Bridgeport, Conn., assignor to The Bassick Company, Bridgeport, Conn., a corporation of Connecticut Filed Aug. 18, 1958, Ser. No. 755,511

4 Claims. (Cl. 16—21)

This invention relates generally to swivel thrust bearings which are subjected to eccentric loading, and more particularly to a sealing arrangement for such bearings.

Swivel thrust bearings have been used for many years in connection with casters, cranes, etc., and the present invention is an improvement upon the ball bearing swivel construction which is the subject of United States Patent No. 1,914,204, issued to W. F. Herold et al., June 13, 1933, and assigned to the assignees of the present application. This patent provides a swivel bearing having a single set of balls arranged to travel on a two-level race, the balls moving from one level to the other on opposite sides of the eccentrically loaded member and so arranged as to take thrust in one direction at one side and in the opposite direction at the other side.

While this type of swivel bearing provides a unique and advantageous arrangement for taking up the thrust produced by eccentric loading, the construction itself presents an increased number of openings or joints in the bearing structure that the prior ball bearing structures do not have. The effect of the increased number of openings in the ball bearing structure allows additional spaces wherein the lubricant normally associated with such bearings can escape, as well as allowing for the entry of dirt and other foreign matter which contaminate and foul the bearing races and the balls. In addition, since the bearing itself includes an additional number of parts and some additional spacing is required to allow relative movement of these parts, there is an increased tendency for the swivel bearing to shimmy during such movement.

It is therefore the principal object of this invention to provide a swivel thrust bearing with improved lubrication sealing.

It is a further object of this invention to provide an improved swivel thrust bearing which includes means for distributing the lubricant throughout the anti-friction bearing.

It is another object of this invention to provide an improved swivel thrust bearing in which the shimmy normally present in such bearings is greatly reduced.

It is an additional object of this invention to provide an improved swivel thrust bearing construction which tends to eliminate the noise normally present when the bearing rotates.

Further objects and advantages of this invention will become apparent as the following description proceeds.

In accordance with one form of this invention, there is provided a swivel thrust bearing for use in a caster construction. The horn of the caster is provided with a pair of segmental flanges which cooperate with a pair of continuous circular bearing surfaces or races in a two-level race arrangement, so that suitable ball bearing elements travel continuously in the two-level race wherein the balls more from one level to the other to take their positions on opposite sides of the eccentrically loaded member. To effectively seal the lubrication within the bearing, there is provided on O-ring which rests upon the outer surface of the segmental flanges and is rigidly secured to the upper bearing race so that rotation of the upper bearing race with respect to the segmental flanges not only seals the bearing, but also aids in distributing the lubricant within the bearing. An upper sealing cap fits over the swivel bearing to aid in reducing the noise and this cap cooperates with the O-ring to reduce the normally present shimmy. Similarly, a lower cup is provided to aid in sealing the assembly.

For a better understanding of this invention, reference may be had to the accompanying drawing in which.

Figure 1:
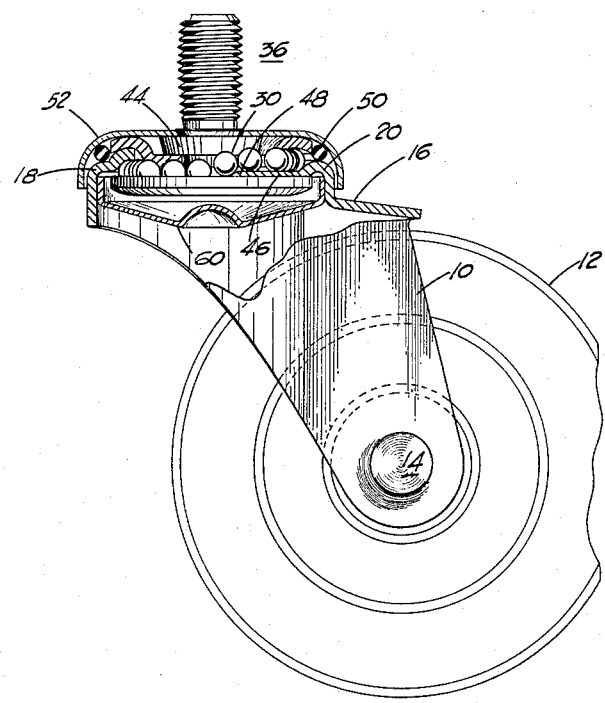
Fig. 1 is a side view partially in section of a caster embodying one form of this invention.
Figure 2:
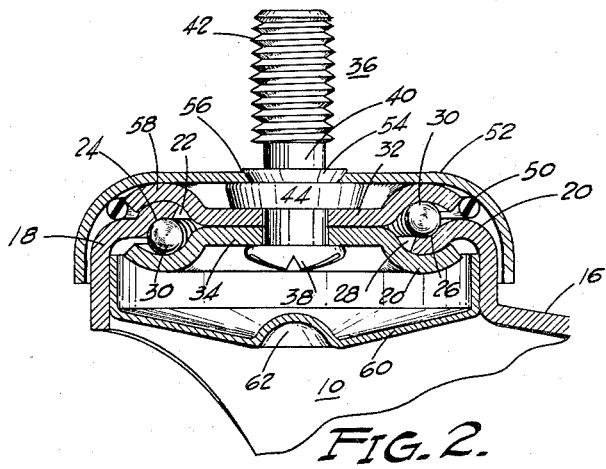
Fig. 2 is an enlarged side sectional detail view of the swivel thrust bearing forming a portion of the caster shown in Fig. 1.
Figure 3:
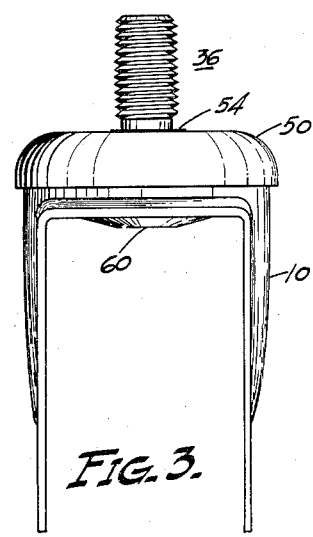
Fig. 3 is a front view of the horn, bearing, and support means of the caster shown in Fig. 1.
Figure 4:
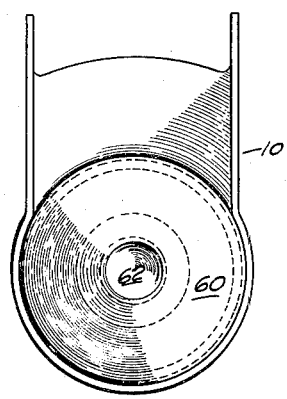
Fig. 4 is a bottom view of the horn construction shown in Fig. 3.

Referring now to the drawing, there is shown a caster construction including a swivel thrust bearing employing the present invention for sealing the bearing and reducing the shimmy and noise normally associated with such structures. The caster includes a horn 10 in which a conventional caster wheel 12 is mounted for rotation by means of axle 14. The horn 10 is provided with an upper flat portion 16 having a pair of segmental flanges 18 and 20 which form a relatively large circular aperture within a portion of the upper horn surface 16. The segmental flange 18 forms a semi-circular open 22 in a forward direction, that is, in the direction of the offset of the wheel axis. The flange 18 is further provided with a bearing surface 24 on the underside thereof. In a similar manner, the segmental flange 20 includes a bearing surface 26 on the upper side thereof extending in a semi-circular manner and directed away from the axis of the caster wheel toward the opposing segmental flange 18 which defines a second semi-circular opening 28. For a complete description of this structure reference may be had to Patent No. 1,914,204. It is therefore apparent that the segmental flange 20 provides a semi-circular surface 26 upon which the balls or elements 30 ride, whereas the segmental flange 18 is positioned above the balls so that the balls contact the bottom surface 24 of this segmental flange when traveling through this portion of the bearing. There is further provided an upper, continuous, annular bearing surface or race 32 which is rigidly coupled to a lower annular member or race 34 which also forms a continuous circular bearing surface. Thus, the swivel thrust bearing comprises the two segmental flanges 18 and 20 and the two continuous annular bearing races 32 and 34 which define an annular cavity through which a continuous series of ball bearings 30 move during rotation of the horn with respect to the caster support. These elements are restrained from any axial movement by means of a conventional center bolt or spindle 36 which includes a head portion 38, a smooth shank portion 40, and terminates in a threaded portion 42 which allows the caster to be mounted in a conventional manner to any member as desired. To securely lock the two circular races together as well as to prevent any relative axial movement between the races and the segmental flanges, there is provided a washer member 44 which is secured upon the smooth shank portion of the center bolt or spindle 36 by any conventional method, such as by a force fit to securely lock the two race members 32 and 34 together to prevent any relative movement between the bolt and the race members.

Reference may be had to Fig. 1 which shows the arrangement for moving the ball bearing elements 30 from one plane to another so as to take their position on opposite sides of the eccentrically loaded horn. The segmental flange 20 is shown to include a vertical, inwardly extending portion 46 which terminates with a beveled edge 48 allowing the balls 30 to move up from the lower level to the upper level as the balls ride over the beveled end 48. As the balls move up from the lower level to the upper level, they are positioned between the segmental flange 20 and the upper bearing race 32, and the upward thrust produced by the load on the wheel axle is thus taken up by the upper bearing race 32 on the side of the bearing towards the caster axle. On the other side of the bearing, the balls move in the lower level and are positioned between the lower bearing race 34 and the segmental flange 18. In this instance, the bearing is subjected to a thrust force in a downward direction which is taken up by the lower bearing race 34.

The present invention is directed to a means for sealing the ball bearing and preventing loss of lubrication, since the lubricant would normally tend to escape from the bearing through the openings provided between the segmental flanges and the associated bearing races. In order to prevent such loss of lubrication and, in addition, to reduce the shimmy normally associated with such swivel-type bearings, there is provided an O-ring 50 which is constructed of rubber or like material and which has a cross-sectional thickness in the order of the thickness of the bearing races as indicated in the drawing. However, the exact thickness of the O-ring need only be sufficient to completely seal the opening which is normally present between the upper bearing race and the segmental flanges. The inner diameter of the annular O-ring gasket is somewhat less than the outer diameter of the upper annular bearing race 32 and is positioned on the bearing so that the bottom surface of the O-ring or annulus is contacting the upper surface of the segmental flanges at a point where the segmental flange joins the bearing races. Since there is relative movement between the bearing races and the segmental flanges and the O-ring is rigidly secured to the upper bearing race, the result is a wiping action being exerted upon the segmental flanges as the bearing races and the spindle rotate relative to the segmental flanges on the caster horn. The O-ring 50 may be rigidly secured to the circular bearing race 32 by any suitable means, such as by cementing or the like.

In addition to sealing the bearing to prevent lubricant from moving outward between the segmental flanges and the bearing races, the O-ring also prevents any dirt or other foreign matter from entering the bearing race from outside the bearing. In order to further reduce the possibility of dirt entering the bearing, as well as to prevent the O-ring from being dislodged from its rigid securement to the upper bearing race, there is provided a sealing cap member 52 which is also rigidly secured to the spindle 36. In the present embodiment, the washer 44, which is rigidly secured to the same spindle, includes a reduced cross-sectional portion 54 having inwardly directed edges 56 so as to allow the sealing cap 52 to be snapped over the edges of this reduced cross-section portion of the washer to effectively and securely lock the cap to the washer. The sealing cap 52 may be secured to the spindle 36 by any conventional means and the means shown are only indicative of one manner in which this may be accomplished. The struture is so designed that the sealing cap 52 rests upon the rounded end portion of the upper bearing race 32 and, in addition, contacts the outer surface of the O-ring so as to insure that the O-ring is held tightly against the outer surface of the segmental flanges. The outer surfaces of the sealing cup extend downwardly past the O-ring and are spaced slightly from the outer surfaces of the segmental flanges so as to prevent foreign matter from contacting the O-ring or any of the inner surfaces of the bearing at this point.

In addition to the upper sealing cap 52, there is also provided a lower sealing cup 60 which acts as a seal between the bottom surface of the segmental flanges and the lower bearing race 20. The lower sealing cup 60 is provided with an inwardly directed protuberance 62 at its center which provides a resilient spring force tending to force the ends of the lower sealing cup against the inner surfaces of the segmental flanges 18 and 20. However, in order to insure that the sealing cup will be retained within the horn, the joint may be cemented after pressing the cup in place.

In operation, rotation of the horn 10 with respect to the spindle 36 will cause the spindle, the upper sealing cap 52, the two races 32 and 34 and the O-ring 50 to rotate relative to the horn 10 and its associated segmental flanges 18 and 20. As a result of such rotation, the lubricant normally associated with such bearings has a tendency to move outwardly between the spaces formed between the members making up the bearing. However, the O-ring 50 will effectively prevent the lubricant from moving outwardly between the members and at the same time will cause any portion of the lubricant contacting the O-ring 50 to move with the O-ring around the periphery of the bearing. Thus, any tendency for the lubricant to mass at any point will be prevented by the O-ring which will redistribute the lubricant throughout the bearing. In addition, since the upper sealing cap 52 extends downwardly over the upper bearing race 32, the O-ring 50 and the outer surface of the segmental flanges 18 and 20, any foreign matter which tends to fall upon the upper surface of the bearing will be prevented from entering the bearing. Likewise, since the upper sealing cap 52 contacts the upper surface of the upper bearing race 32 and the O-ring 50, there will be a tendency to force all of the elements together and to reduce any possibility of vertical movement of the associated bearing parts. Thus, the O-ring in combination with the upper sealing cap will tend to eliminate the shimmy which is normally present with such bearing structures because of the necessity of clearance between the rotating parts. This is essentially so, because the force provided in prior bearing structures to prevent any vertical movement is, of necessity, associated with the spindle at the center of the bearing structure and there is no such force exerted near the periphery. The lower sealing cup 60 will catch any of the lubricant which may be moved as a result of relative rotation and gravity toward the joint between the segmental flanges and the lower bearing race and, at the same time, prevent ingress of any foreign matter through the same joint formed between the mating surfaces.

In addition to the other functions, both the upper sealing cap 52 and the lower sealing cup 60 as well as the O-ring 50 will have a tendency to muffle or prevent transmission of any of the noises normally associated with relative movement of the bearing parts. At the same time, since the upper sealing cap 52 is acting to force the bearing members into engagement at their periphery, the noise produced by any looseness at this point will be eliminated.

While the present embodiment is shown in combination with a caster, it is not desired that the present invention be limited to the particular combination shown and described and the appended claims are intended to cover swivel structures which may or may not be in combination with a caster. In addition, the present invention has application to swivel structures other than those in which the bearing members move from a lower to an upper plane, and may be utilized effectively in bearing structures employed in anti-friction bearings other than the ball bearing type. It is, therefore, intended by the appended claims to cover all modifications, apparent to one skilled in the art, that are within the spirit and scope of this invention, as defined by the appended claims.

What is claimed is:

1. In a swivel assembly; a substantially circular series of anti-friction elements, an annular member forming a continuous circular bearing surface on one side of said circular series of anti-friction elements, at least one other member positioned on the other side of said circular series of anti-friction elements and defining with said annular member a bearing cavity between said members and forming an annular gap at the outer peripheral edge of said annular member, a resilient O-ring positioned adjacent the peripheral edge of said annular member and contacting said other member and adapted to seal said gap, a cap member rigidly positioned adjacent said annular member, said cap member having a portion extending beyond the peripheral edge of said annular member with said portion being directed toward said other member and acting to cover said O-ring, the distance from said cap portion to said peripheral edge of said annular member and said other member at said gap being less than the unstressed cross sectional diameter of said O-ring, whereby said cap member acts to compress said O-ring against the peripheral edge of said annular member and said other member to seal said gap.

2. In a swivel assembly; a substantially circular series of movable anti-friction elements, an annular member forming a continuous circular bearing surface positioned on one side of said series of movable anti-friction elements, at least one other member positioned on the other side of said series of movable anti-friction elements to define with said annular member a bearing cavity between said members, said other member including a portion extending radially beyond the peripheral edge of said annular member to form a gap therebetween, a resilient O-ring rigidly secured to the peripheral edge of said annular member and contacting said other member to seal said gap, a cap member positioned adjacent said annular member and having a portion extending beyond the peripheral edge of said annular member with said portion being directed towards said other member and acting to cover said O-ring, the distance from said cap portion to said peripheral edge of said annular member and said other member at said gap being less than the unstressed cross sectional diameter of said O-ring whereby said cap member acts to compress said O-ring against the peripheral edge of said annular member and said other member to seal said gap.

3. In a swivel assembly; a substantially circular series of anti-friction elements, a first segmental flange for guiding said elements in a first plane, a second segmental flange for guiding said elements in a second plane, means for transferring said elements from one plane to the other, members forming continuous circular bearing surfaces on either side of said anti-friction elements and said segmental flanges and forming a gap between one of said members and said segmental flanges, a resilient O-ring secured to said one member and contacting said segmental flanges to seal said gap and distribute lubricant throughout the series of anti-friction elements, a cap member rigidly positioned adjacent said one member, having said O-ring secured thereto, said cap member having a portion extending beyond the peripheral edge of said one member with said portion being directed towards said segmental flanges and acting to cover said O-ring, the distance from said cap portion to the peripheral edge of said one member and said segmental flanges at said gap being less than the unstressed cross sectional diameter of said O-ring, whereby said cap member acts to compress said O-ring against the peripheral edge of said one member and said segmental flanges to seal said gap.

4. In a swivel assembly including at least two rotatably connected swivel members defining a hollow annular cavity therebetween for receiving a substantially circular series of anti-friction elements, one of said members being annular in shape, the outer peripheral edge of said one annular member forming an annular gap with said other member, a resilient O-ring secured to the outer periphery of said one annular swivel member and adapted to contact the adjacent surface of said other swivel member to seal the gap therebetween, a cap member rigidly positioned adjacent said one annular member and having a portion extending beyond the peripheral edge of said one annular member with said portion being directed towards said other member and acting to cover said O-ring, the distance from said cap portion to said peripheral edge of said one annular member and said other member at said gap being less than the unstressed cross sectional diameter of said O-ring.

References Cited in the file of this patent

UNITED STATES PATENTS

| | | |
|---|---|---|
| 1,884,142 | Noelting | Oct. 25, 1932 |
| 1,885,990 | Chesnutt | Nov. 1, 1932 |
| 1,914,204 | Herold | June 13, 1933 |
| 2,369,609 | Sandberg | Feb. 13, 1945 |
| 2,617,668 | Stewart | Nov. 11, 1952 |
| 2,787,804 | Noelting et al. | Apr. 9, 1957 |
| 2,799,514 | Kramcsak | July 16, 1957 |